March 20, 1962 SHINRO FUKUDA ET AL 3,026,215

PROCESS OF PRODUCING MAGNETIC SOUND RECORDING MATERIAL IN WHICH CO-NI-FE FERRITE COLUMNAR PARTICLES ARE PLACED IN A DIRECT CURRENT MAGNETIC FIELD AND ORIENTED BY MEANS OF AN ULTRASONIC WAVE AND AFTERWARDS HEATED AND COOLED IN THE DIRECT CURRENT MAGNETIC FIELD

Filed March 9, 1960

3,026,215
Patented Mar. 20, 1962

3,026,215

PROCESS OF PRODUCING MAGNETIC SOUND RECORDING MATERIAL IN WHICH Co-Ni-Fe FERRITE COLUMNAR PARTICLES ARE PLACED IN A DIRECT CURRENT MAGNETIC FIELD AND ORIENTED BY MEANS OF AN ULTRASONIC WAVE AND AFTERWARDS HEATED AND COOLED IN THE DIRECT CURRENT MAGNETIC FIELD

Shinro Fukuda, Tokuaki Miyake, Goro Akashi, and Mitsuru Seto, all of Odawara-shi, Kanagawa-ken, Japan, assignors to Fuji Shashin Film Kabushiki Kaisha, Kanagawa-ken, Japan, a corporation of Japan Filed Mar. 9, 1960, Ser. No. 13,919
1 Claim. (Cl. 117—93)

The present invention relates to a process of producing a novel magnetic recording material which is excellent in sensitivity and frequency characteristics. The magnetic material is applicable for use on sound recording tape, video tape, tape for electronic computers, magnetic sound recording track for movie film, sound recording sheet, and the like.

The process according to the present invention is characterized in that fine powder of ferrite which is less than 10$\mu$ in maximum size and containing 0.2–35% of cobalt by metal atomic ratio is heated at a temperature higher than 50° C. and lower than 600° C., which corresponds to the sintering temperature of the ferrite, and then is cooled. Both the heating and cooling is performed in a magnetic field so that the magnetization characteristic curve of the each particle is made steep in the direction of the magnetic field while the particles remain dispersed. A dispersed lacquer is formed from the particles which is then applied on a base. The particles in the lacquer are oriented magnetically or mechanically and then hardened on the base. Consequently the process according to the present invention provides a coated type magnetic recording material which has excellent anisotropic characteristics and high sensitivity.

According to the process of the present invention, the magnetic particles, even though granular give excellent anisotropic characteristics and a steep magnetization characteristic curve in the treated direction. The magnetic material used for the process according to the present invention is ferrite containing 0.2–35% cobalt by metal atomic ratio as described above. The material, is Co ferrite ($CoFe_3O_4$) when the cobalt content is 33% and Co-Fe ferrite when the content is less. The ferrite particles containing other metal components give similar results.

Further detailed explanation of the invention is made by way of examples of embodiments of the present invention as follows:

EXAMPLE 1

Fine powders, containing particles having a means diameter is 0.3$\mu$ and a maximum diameter of 10$\mu$ of Co-Mn-Fe ferrite containing 3% of cobalt and 8% of manganese by metal atomic ratio are put into a hard-glass tube. The tube is then filled with nitrogen gas and sealed in a vacuum of about 100 mm. Hg. The contents of the tube are then heated to 300° C. for about 10 minutes in a D.C. magnetic field of 1000 gausses, and then cooled in said magnetic field at a cooling speed of 50° C./min.

The magnetic material is then taken out of the tube and formed into a lacquer after being dispersed in the following weight ratio:

| | Parts |
|---|---|
| Co-Mn-Fe ferrite | 300 |
| Nitro-cellulose | 70 |
| Paraffin chloride | 10 |
| Butyl acetate | 300 |
| Ethyl acetate | 200 |
| Toluene | 200 |

This lacquer is spread on a base of cellulose triacetate of 38$\mu$ thickness so that the dried thickness of the magnetic layer is 12$\mu$ and the tape is then passed through a treating solenoid which produces an A.C. magnetic field of 200 gausses at 10 kc. to a D.C. magnetic field of 500 gausses to the lengthwise direction of the tape, and thereafter the tape is dried.

EXAMPLE 2

Magnetic powders of columnar particles having a mean particle size of 0.2$\mu$ x 0.2$\mu$ x 1.5$\mu$ and a maximum size of 10$\mu$ of Co-Ni-Fe ferrite containing 2% of cobalt and 5% of nickel are sealed in a hard glass tube. The tube is placed in a D.C. magnetic field of 500 gausses and the particles are oriented in the direction of the magnetic field by ultrasonic wave of 80 kc. The tube is then heated at 200° C. for about 30 min. and then cooled at a rate of 20° C./min., said heating and cooling being carried out in said D.C. magnetic field.

The magnetic material is then formed as a lacquer as in the previous example and is applied to a base and dried in a D.C. magnetic field of 1000 gausses as in the previous example. The particles are oriented in the lengthwise direction of the tape. Thus a magnetic recording tape of high sensitivity in the lengthwise direction of the tape is obtained.

EXAMPLE 3

Granular magnetic material, having particles of mean diameter of 0.5$\mu$ and a maximum diameter of 10$\mu$ of Co-Ni-Fe ferrite containing 14% of cobalt, 5% of nickel and 2% of magnesium by metal atomic ratio is heated, cooled and applied as in Example 2. A tape of high sensitivity in the lengthwise direction of the tape is obtained. The direction of the magnetic field may also be oriented in the breadthwise direction of the tape, if desired. The tape thus prepared is suitable for a video tape recorder of the Ampex type.

EXAMPLE 4

Particles having a mean diameter of 1.2$\mu$ and a maximum diameter of 10$\mu$ of fine powder of Co-Fe ferrite containing 11% of cobalt is treated as in Example 1 and then dispersed according to the following ratio and formed as a lacquer.

| | Parts |
|---|---|
| Co-Fe ferrite | 300 |
| Copolymer of vinyl chloride and vinyl acetate | 350 |
| Plasticizer (D.O.P.) | 50 |
| Tetrahydrofuran | 3000 |

The lacquer is spread on a tape and is treated in a D.C. magnetic field of 1500 gausses so that the magnetic characteristic is oriented in the lengthwise direction of the tape. The lacquer then is dried in said magnetic field and a homogeneous tape of 40$\mu$ thickness is obtained.

Table I below illustrates the magnetic characteristics of the respective tapes obtained by the above examples.

*Table I*

| | Example (Magnetic material) | Coercive Force (iHc), oe. | Max. residual magnetic induction (Br) max. gauss | (ΔBr/ΔH) max. o. | Ratio (iBm/Br) |
|---|---|---|---|---|---|
| I | (Co-Mn-Fe ferrite) treated. | 305 | 980 | 10.0 | 1.24 |
| | non-treated | [200] | [630] | [4.2] | [1.67] |
| II | (CoNiFe ferrite) treated. | 300 | 1150 | 12.0 | 1.19 |
| | non-treated | [240] | [670] | [4.5] | [1.53] |
| III | (CoNiMgFe ferrite) treated. | 1030 | 980 | 10.4 | 1.18 |
| | non-treated | [850] | [550] | [3.4] | [1.63] |
| IV | (CoFe ferrite) treated. | 1,100 | 1,200 | 10.1 | 1.25 |
| | non-treated | [870] | [700] | [3.5] | [1.52] |

Values in the brackets in Table I under the heading "non-treated" apply to tapes made of the same magnetic material and by same method as those of each example, but which are not applied and dried according to the present invention. It is evident from Table I that the effect obtained according to the present invention is very remarkable.

In the accompanying drawing is shown a comparison of the magnetic characteristics between various tapes.

Figure 1:
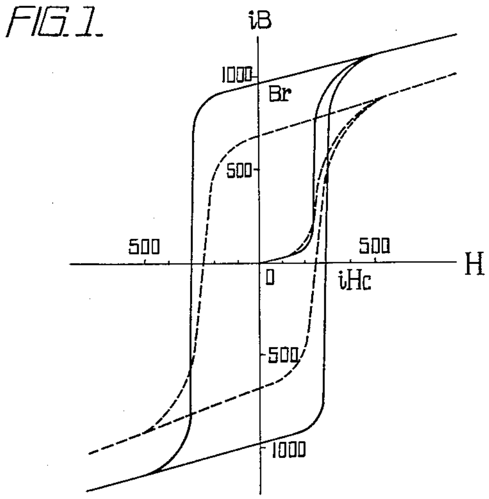
FIG. 1 shows a comparison between the magnetic characteristics of a tape according to Example 1 of the present invention as shown in solid lines and that produced by the conventional Goethite method as shown in dotted lines.
Figure 2:
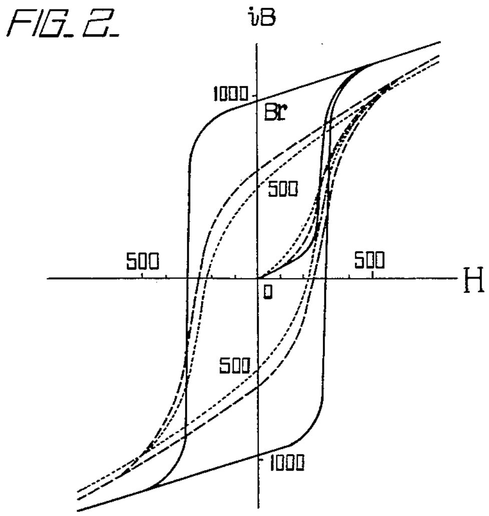
FIG. 2 shows a comparison between the magnetic characteristics of a tape according to Example 1 as shown in solid lines, a non-treated tape according to Example 1 and shown in long dash lines and a tape according to the present invention in a direction perpendicular to the direction of treatment by the magnetic field as shown in short dash lines.

It is noted from FIGS. 1 and 2 of the drawing that the magnetic characteristic curve is steep in the direction of treatment and an excellent product is obtained by the process according to the invention.

Table II below shows a comparison of tapes of magnetic powder made according to Example 1 and heat treated at the temperature range from 50° C.–600° C. as well as heat treated at 700° C., and without any heat treating.

*Table II*

| Temperature of treatment | Coercive force (iHc), oe. | Max. residual magnetic induction (Br) max. gauss | (ΔBr/ΔH) max. o. | Ratio (iBm/Br) |
|---|---|---|---|---|
| (Non-treated) | [260] | [630] | [4.2] | [1.67] |
| 50° C | 260 | 680 | 4.3 | 1.60 |
| 70° C | 270 | 800 | 5.9 | 1.48 |
| 100° C | 280 | 840 | 6.8 | 1.34 |
| 150° C | 295 | 900 | 8.3 | 1.30 |
| 200° C | 305 | 980 | 10.0 | 1.24 |
| 300° C | 305 | 980 | 10.5 | 1.23 |
| 400° C | 307 | 960 | 10.0 | 1.30 |
| 500° C | 305 | 950 | 9.3 | 1.33 |
| 600° C | 280 | 890 | 8.2 | 1.40 |
| 700° C | 240 | 800 | 8.2 | 1.59 |

It is evident from Table II that the magnetization effect becomes remarkable beginning with the treating temperature of 50° C. and the higher the temperature the more remarkable the effect, however beyond 600° C. the magnetic characteristic decreases due to the roughness of the surface of the magnetic layer which results from the dispersibility of particles due to the sintering of the particles.

The process according to the present invention gives an excellent anisotropic magnetic characteristic to magnetic powder and prevents the magnetic fine particles from sintering each other, while high dispersion is maintained and the diameter of the particles is kept small. Further in the use of columnar particles as in Example 2, the magnetic orientation at spreading may be carried out by methods other than magnetic force such as mechanical stretching of the tape.

What is claimed is:

A process for producing magnetic recording tape comprising placing fine magnetic powders of columnar particles of Co-Ni-Fe ferrite containing 2% of cobalt and 5% of nickel by metal atomic ratio in a direct current magnetic field and orienting said columnar particles to the direction of the magnetic field by an ultrasonic wave, heating the magnetic powders at 200° C. for about 30 minutes, cooling the magnetic powders at a rate of 20° C./min., said heating and cooling being executed in said direct current magnetic field, forming a lacquer dispersion of said particles, applying the dispersion lacquer on a film base to form a magnetic layer thereon, magnetically orienting the particles on said film base and hardening said magnetic layer on said base to permanently orient said particles thereon.

References Cited in the file of this patent

UNITED STATES PATENTS 2,796,359 Speed ---------- July 18, 1957

FOREIGN PATENTS 751,842 Great Britain ---------- July 4, 1956

795,906 Great Britain ---------- June 4, 1958